(12) United States Patent
Okuda

(10) Patent No.: US 7,481,561 B2
(45) Date of Patent: Jan. 27, 2009

(54) VEHICLE LIGHTING DEVICE

(75) Inventor: Haruo Okuda, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 12/000,371

(22) Filed: Dec. 12, 2007

(65) Prior Publication Data

US 2008/0144329 A1 Jun. 19, 2008

(30) Foreign Application Priority Data

Dec. 19, 2006 (JP) .............................. 2006-341076

(51) Int. Cl.
*F21V 11/00* (2006.01)
(52) U.S. Cl. ..................... 362/539; 362/538; 362/543; 362/544; 362/523
(58) Field of Classification Search ................. 362/469, 362/466, 468, 523
See application file for complete search history.

(56) References Cited

U.S. PATENT DOCUMENTS

| 3,818,265 A | 6/1974 | Hicks et al. |
| 2006/0120094 A1 | 6/2006 | Tsukamoto et al. |
| 2007/0058387 A1* | 3/2007 | Takada ....................... 362/539 |

FOREIGN PATENT DOCUMENTS

| EP | 1 085 254 A2 | 3/2001 |
| EP | 1 669 665 A2 | 6/2006 |
| EP | 1 705 422 A1 | 9/2006 |
| EP | 1 857 731 A2 | 11/2007 |
| FR | 2 760 418 | 9/1998 |
| JP | 2005-228715 A | 8/2005 |
| JP | 2005-285509 A | 10/2005 |

\* cited by examiner

*Primary Examiner*—Anabel M Ton
(74) *Attorney, Agent, or Firm*—Foley & Lardner LLP

(57) ABSTRACT

A vehicle lighting device includes at least one lamp unit, a holder that holds the lamp unit in a rotatable manner around a vertical axis, and a drive unit that rotates the lamp unit around the vertical axis.

4 Claims, 8 Drawing Sheets

VEHICLE LIGHTING DEVICE

CROSS-REFERENCE TO RELATED APPLICATIONS

The present application claims priority to and incorporates by reference the entire contents of Japanese priority document 2006-341076 filed in Japan on Dec. 19, 2006.

BACKGROUND OF THE INVENTION

1. Field of the Invention

The present invention relates to a vehicle lighting device.

2. Description of the Related Art

There is a lighting device for a vehicle that includes a projector-type lamp unit using a semiconductor light source, and that is capable of changing a light radiating direction of a light radiated from the lamp unit according to a driving condition of the vehicle, such as a vehicle lighting device disclosed in Japanese Patent Application Laid-open No. 2005-285509. The conventional vehicle lighting device consists of a light emitting diode (LED) and an optical element such as a condenser lens, and is configured such that a plurality of light source modules each having an optical axis extending horizontally in a forward direction are aligned in a lateral direction of the vehicle, the light source modules are connected to each other through a power transmission mechanism, and the power transmission mechanism or one of the light source modules is connected to a rotary driving unit.

The conventional vehicle lighting device is operated in the following manner. When the LED is turned on, a light from the LED is radiated forward. By operating the rotary driving unit, a driving force is transmitted to the light source modules through the power transmission mechanism so that optical axes of all the light source modules rotate in the same direction, changing a light radiation range. Consequently, the conventional vehicle lighting device can be employed for an adaptive front lighting system (AFS), that is, the light radiation range can be changed according to the driving condition of the vehicle.

However, because the conventional vehicle lighting device is of a type in which the LED and the optical element such as the condensing lens are aligned in a row and the light axis extends in the forward direction, the size of the light source module becomes large in the forward direction. Therefore, the conventional vehicle lighting device needs to have a large space sufficient for rotating the optical axes of the light source modules. Thus, there is a limitation in layout of the vehicle lighting device in the positional relationship relative to other vehicle devices and components.

SUMMARY OF THE INVENTION

It is an object of the present invention to at least partially solve the problems in the conventional technology.

A vehicle lighting device according to one aspect of the present invention includes at least one lamp unit of a projector-type; a holder that holds the lamp unit in such a manner that the lamp unit the lamp unit rotates around a substantially vertical axis; and a drive unit that drives the lamp unit. The lamp unit includes a reflector including a reflection surface having a substantially elliptical shape with a first focal point, a second focal point, and an optical axis, a semiconductor light source including a light emitter located at or near the first focal point, a projection lens including a lens focal point and a lens optical axis, in which the lens optical axis is substantially horizontal, which projects a predetermined light distribution pattern (LP) in a predetermined direction, and a planer reflection surface arranged between the projection lens and the lens focal point to intersect with the lens optical axis, which reflects the predetermined light distribution pattern toward the projection lens. The lens focal point presents as a pseudo lens focal point at a position symmetrical with respect to the planar reflection surface by the planar reflection surface. The pseudo lens focal point is positioned at or near the second focal point. The lens optical axis presents as a pseudo lens optical axis that intersects at a right angle with the lens optical axis by the planar reflection surface. The pseudo lens optical axis substantially coincides with the optical axis. A light radiating direction of a light ray radiated from the lamp unit is changed according to a driving condition of a vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic diagram for explaining a state in which a semiconductor light source is turned on.

DETAILED DESCRIPTION OF THE PREFERRED EMBODIMENTS

Figure 1:
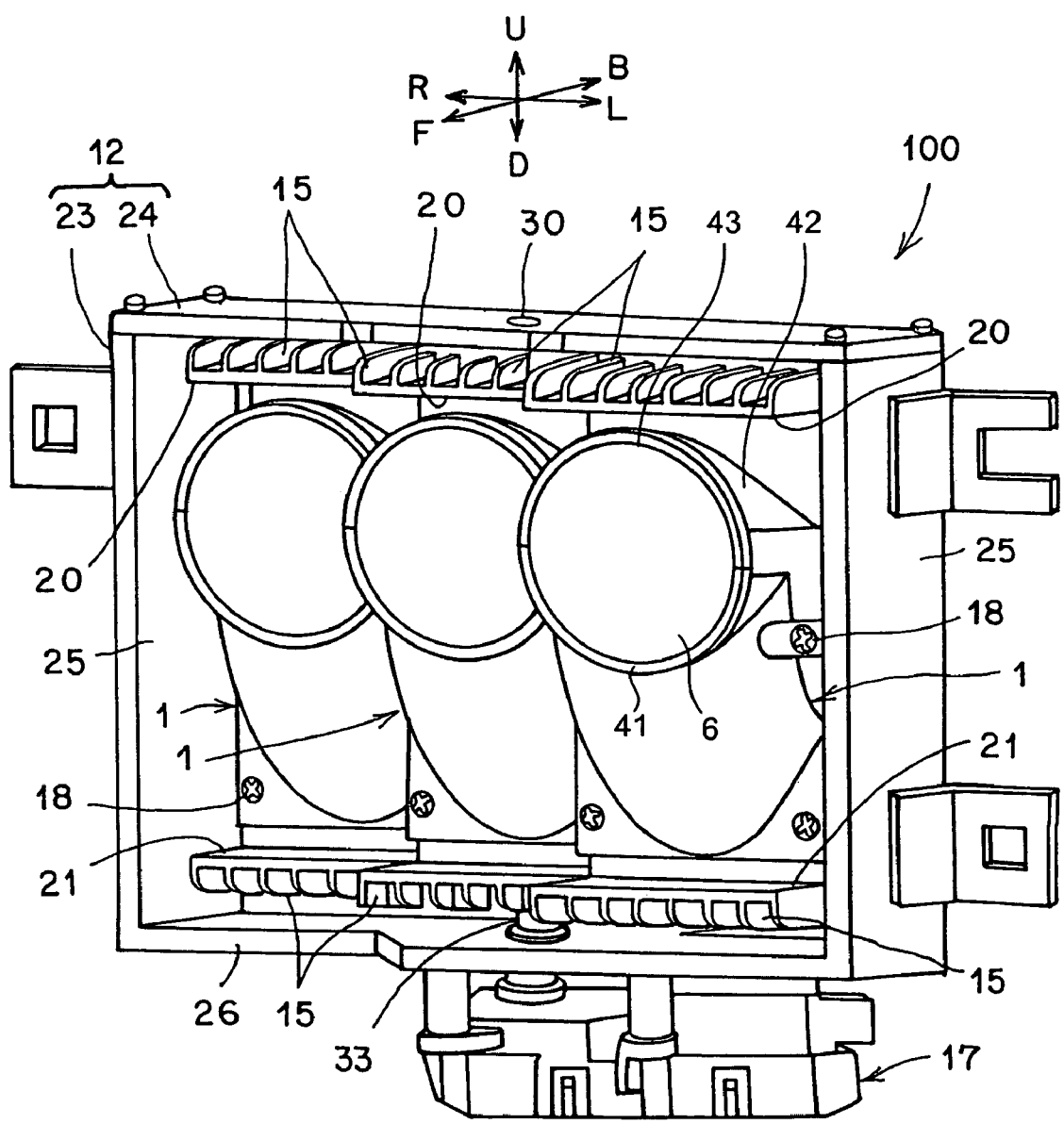
FIG. 1 is a perspective view of a vehicle lighting device according to an embodiment of the present invention.
Figure 2:
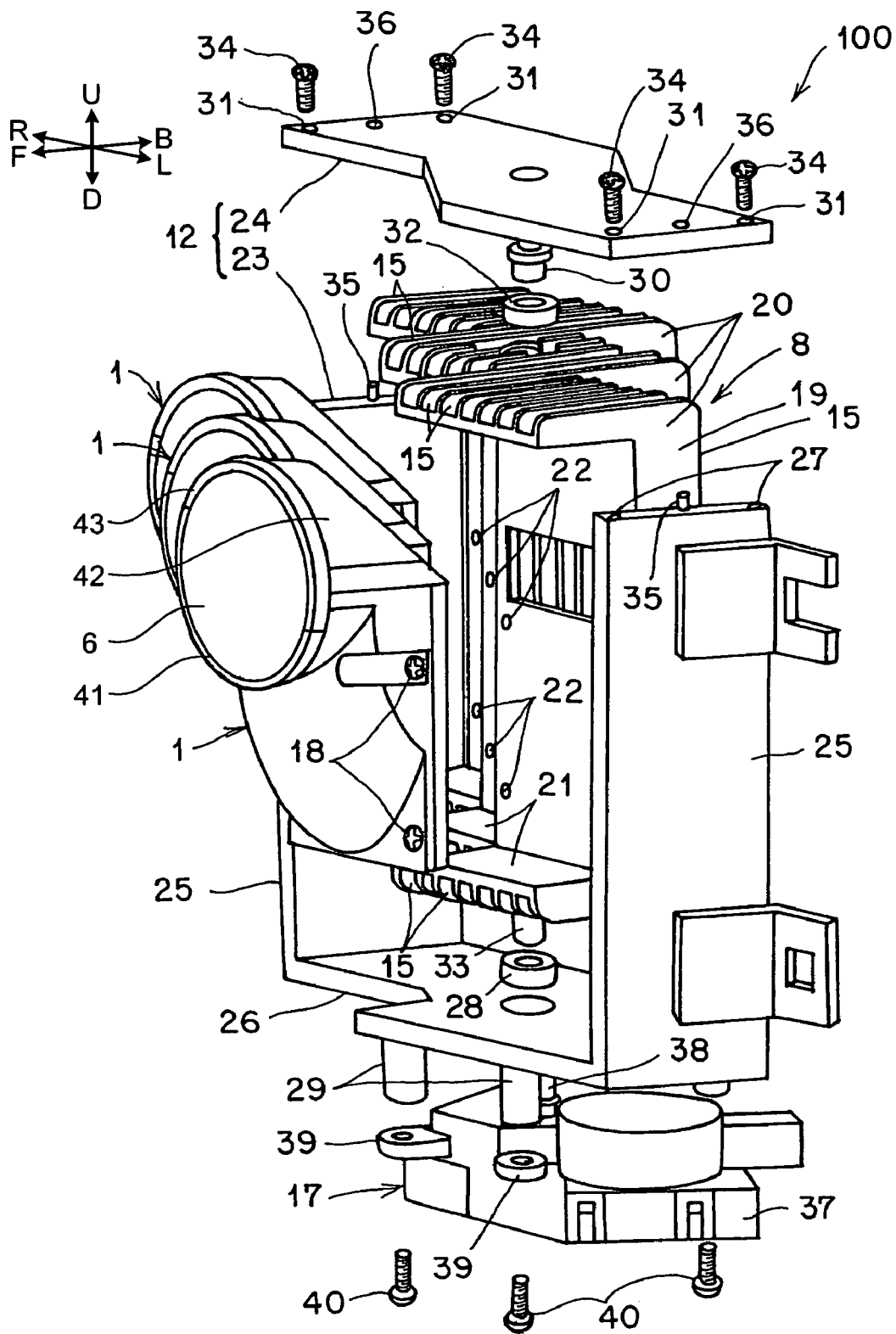
FIG. 2 is an exploded perspective view of a relevant part of the vehicle lighting device shown in FIG. 1.

Exemplary embodiments of the present invention are explained in detail below with reference to the accompanying drawings. The terms "front, rear, upper, lower, left, and right" mean "front, rear, upper, lower, left, and right" of a vehicle when a vehicle lighting device 100 is mounted thereon. In the drawings, a symbol "F" denotes a front direction of the vehicle (automobile) (a forward-moving direction of an automobile), a symbol "B" denotes a back direction of the vehicle, a symbol "U" denotes an upper direction when seeing the front direction from a driver side, a symbol "D" denotes a downward direction when seeing the front direction from the driver side, a symbol "L" denotes a left direction when seeing the front direction from a driver side, a symbol "R" denotes a right direction when seeing the front direction from the driver side, a symbol "VU-VD" denotes a vertical line in an up and down direction with respect to a screen, and a symbol "HL-HR" denotes a horizontal line in a right and left direction with respect to the screen.

In the drawings, the vehicle lighting device 100 is, for example, an automobile headlamp, and is mounted on each of the right side and the left side on a front portion of the vehicle. The vehicle lighting device 100 mounted on the right side is explained below because the vehicle lighting device mounted on the left side has a configuration substantially symmetric to the vehicle lighting device 100 on the right side.

As shown in FIGS. 1 to 5 and 7, the vehicle lighting device 100 includes a plurality of lamp units 1 (three lamp units 1 in the embodiment), a holder 12 that holds the lamp units 1 in a rotatable manner around a vertical or substantially vertical axis V (hereinafter, simply "a vertical axis V"), a drive unit 17 that rotates the lamp units 1 around the vertical axis V, and a lamp housing (not shown) and a lamp lens (e.g., a plain outer lens) (not shown) for an automobile headlamp.

The lamp units 1, the holder 12, and the drive unit 17 are arranged in a lamp room divided by the lamp housing and the lamp lens via, for example, an optical axis adjusting mechanism (not shown). The vehicle lighting device 100 can be configured by arranging lamp units other than the lamp units 1 in the lam room.

As shown in FIGS. 1 to 5, 7, 9, and 10, the lamp unit 1 is of a projector-type, having a unit structure. The lamp unit 1 includes a first reflector (a main reflector) 2 on the front side, a second reflector (a sub-reflector, also used as a shade) 3 on the backside, a semiconductor light source 4, a shade 5, a projection lens (a convex lens, or a condenser lens) 6, a planar reflection surface 7, and a heat sink 8.

The first reflector 2 and the second reflector 3 are formed of a light-reflecting resin material, and working as a holding member such as a casing, a housing, and a holder. The first reflector 2 and the second reflector 3 are formed by dividing a reflector into two pieces in the front and rear direction along a vertical or substantially vertical (hereinafter, simply "vertical") optical axis Z2-Z2 of a first reflection surface 9. The first reflector 2, the second reflector 3, and the heat sink 8 are fixed integrally to each other by a fixing member 18 (e.g., a bolt and nut, a screw, a caulking, and a clip). In the embodiment, screws are used as the fixing member 18.

In the first reflector 2, a portion from the upper side to the backside is open, and a portion from the front side to the lower side and to both right and the left sides is closed. A front edge 41 of an opening on the upper side of the first reflector 2 is formed into a lower semicircular shape. An aluminum deposition, a silver painting, or the like is performed on the concave inner surface of the closed portion of the first reflector 2 to provide the first reflection surface 9 serving as an elliptical reflection surface. A plurality of screw holes (not shown) into which the screws 18 are screwed or through holes (not shown) through which the screw holes 18 are inserted are formed roughly at the four corners of the first reflector 2.

The first reflection surface 9 is an elliptical reflection surface such as a reflection surface having an elliptical shape and a reflection surface based on an ellipse, including a reflection surface having an ellipsoid of revolution or a free curved surface (a NURBS curved surface) based on an ellipse. The free curved-surface based on an ellipse is a surface in which a vertical cross section shown in FIGS. 9 and 10 forms an ellipse and a horizontal or a substantially horizontal (hereinafter, simply "horizontal") cross section (not shown) forms a parabolic or a deformed parabolic surface. The first reflection surface 9 includes a first focal point F1, a second focal point F2, and the vertical optical axis Z2-Z2. When the first reflection surface 9 has the ellipsoid of revolution, the second focal point F2 is a focal point, and when the first reflection surface 9 has the free curved surface based on an ellipse, the second focal point F2 is a focal line on a horizontal cross section, that is, a curved focal line such that both ends are located on the upper side and the center is located on the lower side as viewed from the front.

The second reflector 3 has a vertical plate shape, and closes the opening in the lower half of the first reflector 2, that is, the opening on the backside of the first reflector 2. On the upper side of the second reflector 3, a closing portion 42 that closes the opening in the upper half of the first reflector 2, that is, the opening on the upper side of the first reflector 2 is integrally provided. In the closing portion 42, a front portion is open, and a portion from the upper side to the backside and to both right and left sides is closed. An edge 43 of the opening on the front side of the closing portion 42 is formed into an upper semicircular shape. The edge 41 of the first reflector 2 and the edge 43 of the second reflector 3 are combined with each other to form a circular shape.

An opening 10 is formed in the second reflector 3 from the central portion to the lower portion. An aluminum deposition, a silver painting, or the like is performed on the front surface of the second reflector 3 to provide a second reflection surface 11 that has a planar or substantially planar surface (hereinafter, simply "a planar surface") and extends along the vertical optical axis Z2-Z2. The second reflection surface 11 is provided between the second focal point F2 or in the vicinity thereof (hereinafter, simply "the second focal point F2") and the semiconductor light source 4. A plurality of screw holes (not shown) into which the screws 18 are screwed or through holes (not shown) through which the screw holes 18 are inserted are formed roughly at four corners of the second reflector 3.

As the semiconductor light source 4, a self-emitting semiconductor light source such as an LED and an electroluminescence (EL) (e.g., an organic EL) is used. In the embodiment, the LED is used as the semiconductor light source 4. The semiconductor light source 4 includes a substrate 16, an emitter (not shown) that is a minute rectangular (square) light source chip (a semiconductor chip) fixed on one surface of the substrate 16, a light transmitting member 13 that covers the emitter, and a connector (not shown) or a harness (not shown) that is connected to a power source (not shown). The semiconductor light source 4 is held by a holding member (not shown), and is fixed to the second reflector 3 or the heat sink 8 through the holding member. The emitter of the semiconductor light source 4 is arranged at the first focal point F1 or in the vicinity thereof (hereinafter, simply "the first focal point F1").

Figure 6:
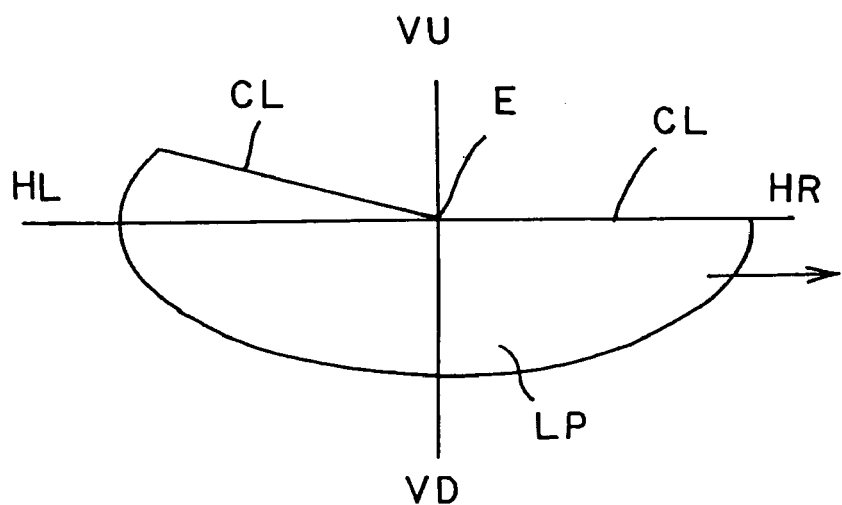
FIG. 6 is a schematic diagram for explaining a light distribution pattern for passing when the lamp units are directed forward.
Figure 7:
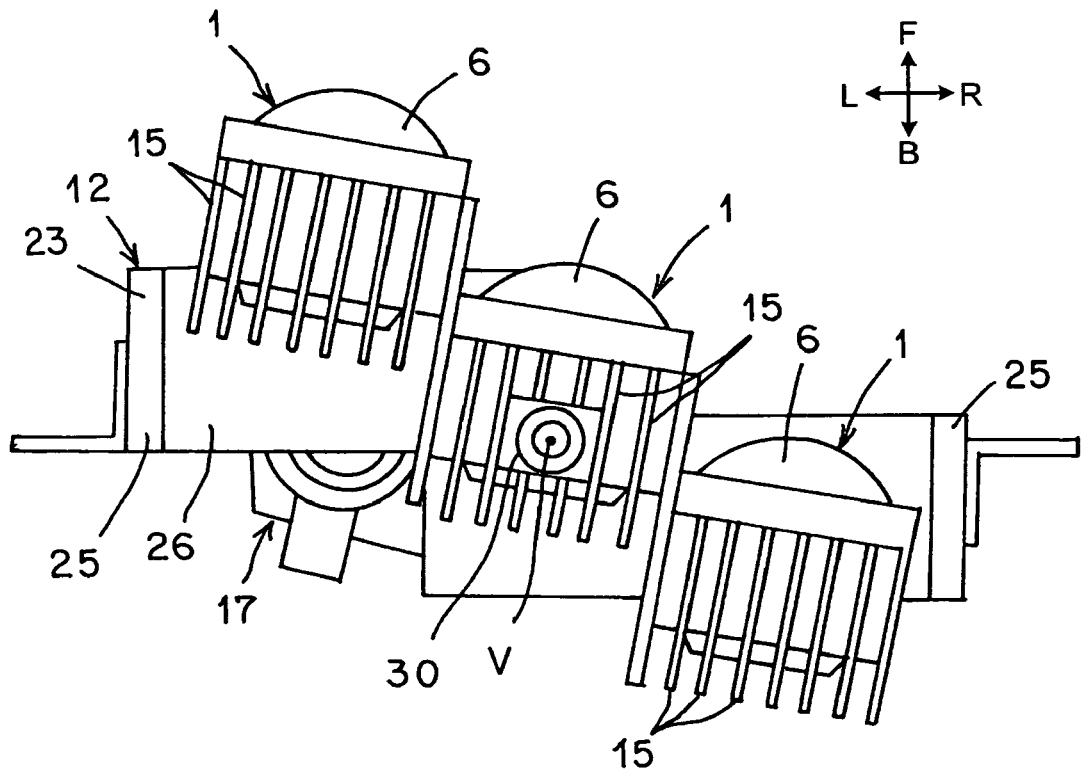
FIG. 7 is top view of the vehicle lighting device in which the top plate is removed and the lamp units are directed right.
Figure 8:
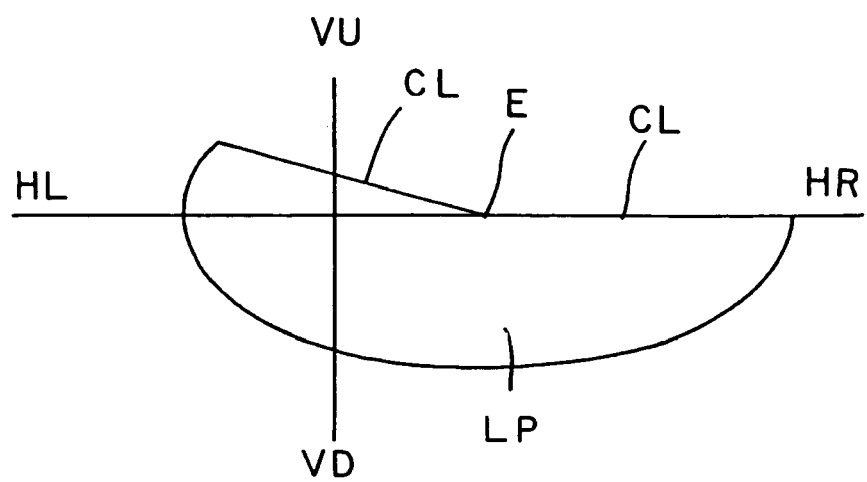
FIG. 8 is a schematic diagram for explaining the light distribution pattern for passing when the lamp units are directed to right.

The shade 5 is provided integrally with the second reflector 3. Specifically, the shade 5 also works as the second reflector 3. Therefore, the second reflection surface 11 is provided to the shade 5. The shade 5 is arranged between the second focal point F2 and the semiconductor light source 4. The shade 5 is provided with an edge 14 along the second focal point F2. The shade 5 cuts off some of reflected light rays L4 that are emitted from the semiconductor light source 4 and are reflected by the first reflection surface 9, and forms a predetermined light distribution pattern LP having a cutoff line CL (e.g., a light distribution pattern for passing and a light distribution pattern for expressway) as shown in FIGS. 6 and 8 with remaining reflected light rays L4. In the embodiment, the shade 5 forms the light distribution pattern for passing LP. The edge 14 forms the cutoff line CL and an elbow point E of the light distribution pattern for passing LP.

The projection lens 6 is positioned by the edge 41 having a lower semicircular shape and the edge 43 having an upper semicircular shape to be attached to the first reflector 2 and the second reflector 3. The projection lens 6 can be attached to the first reflector 2 and the second reflector 3 with a ring member (not shown). The projection lens 6 is an aspherical convex lens. The front side (the outer side) of the projection lens 6 forms a convex aspherical surface having a large curvature (a small radius of curvature), and the backside (the planar reflection surface 7 side) of the projection lens 6 forms a convex aspherical surface having a small curvature (a large radius of curvature). Use of the projection lens 6 decreases the focal distance, so that the dimension in the direction of a horizontal lens optical axis Z1-Z1 of the projection lens 6 is decreased. The backside of the projection lens 6 can form a planar aspherical surface (a planar surface).

The projection lens 6 includes a lens focal point FL1 that is a front focal point (a focal point on the planar reflection surface 7 side) located at the position of a front focus (a front focal distance) FF from the projection lens 6, a back focal point (a focal point on the outer side) (not shown) located at the position of a back focus (a back focal distance) from the projection lens 6, and the horizontal lens optical axis Z1-Z1 that connects the lens focal point FL1 and the back focal point to each other. The vertical optical axis Z2-Z2 and the horizontal optical axis Z1-Z1 intersect at right angles. The lens focal point FL1 is a meridional image surface that is a focal plane on the object space side. Because the light from the semiconductor light source 4 does not generate high heat, a resin-made lens can be used as the projection lens 6. In the embodiment, the projection lens 6 is acrylic lens. The projection lens 6 projects, to the front, the predetermined light distribution pattern for passing LP that is reflected by the planar reflection surface 7 and includes the cutoff line CL and a predetermined auxiliary light distribution pattern (not shown) formed by reflected light from the second reflection surface 11.

The planar reflection surface 7 is formed by subjecting the surface of the closing portion 42 provided integrally between the semicircular edge 43 and the edge 14 to aluminum deposition, silver painting or the like. The planar reflection surface 7 is integral with the closing portion 42. The planar reflection surface 7 can be formed of a member separate from the closing portion 42, and can be provided to the surface of the closing portion 42.

The planar reflection surface 7 is arranged between the projection lens 6 and the lens focal point FL1 to intersect with the horizontal lens optical axis Z1-Z1 at an angle of 45° or approximately 45°. The planar reflection surface 7 reflects the predetermined light distribution pattern including the cutoff line CL and the auxiliary light distribution pattern to the projection lens 6.

Figure 9:
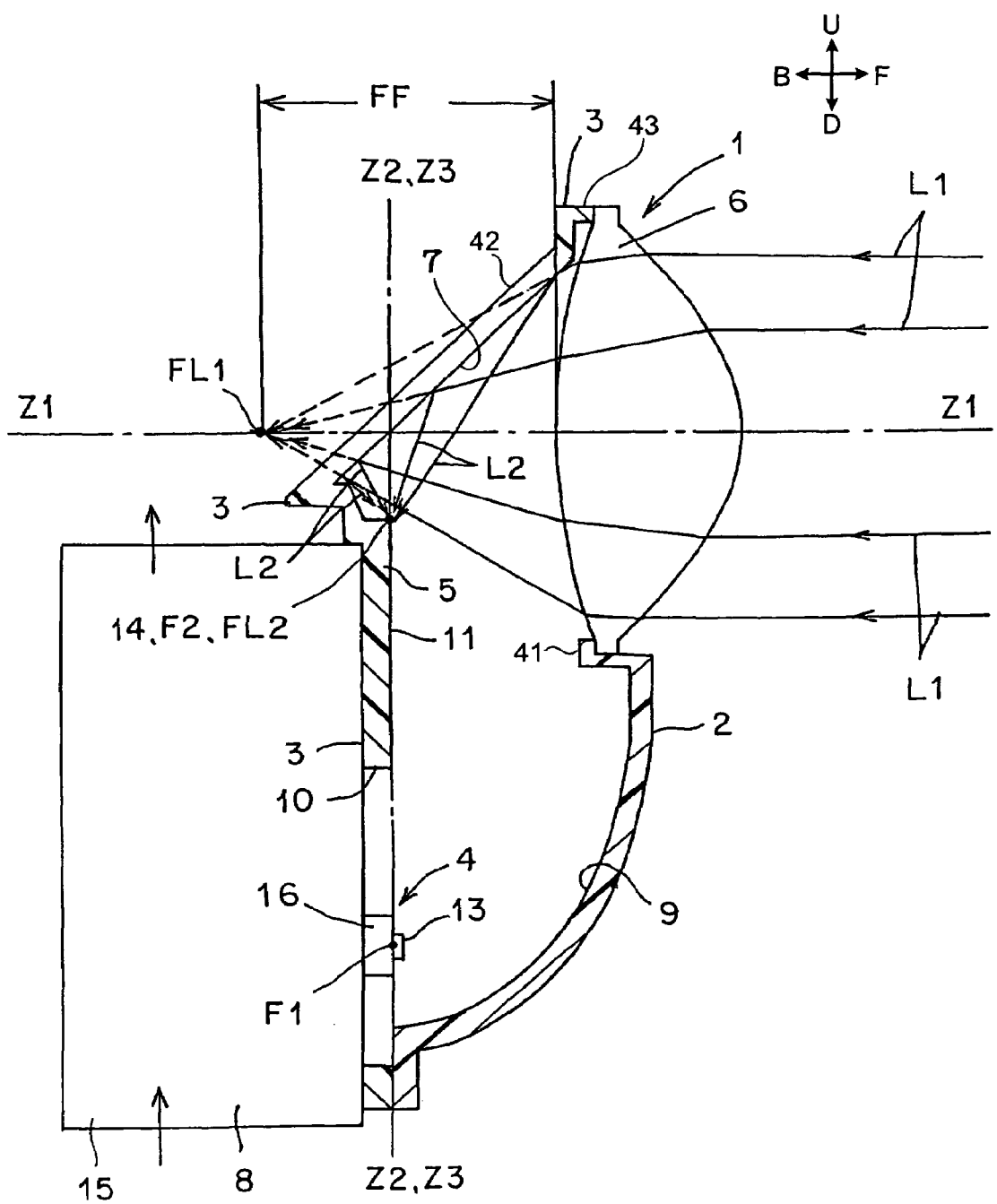
FIG. 9 is a schematic diagram for explaining an operation principle of a planar reflection surface.
Figure 10:
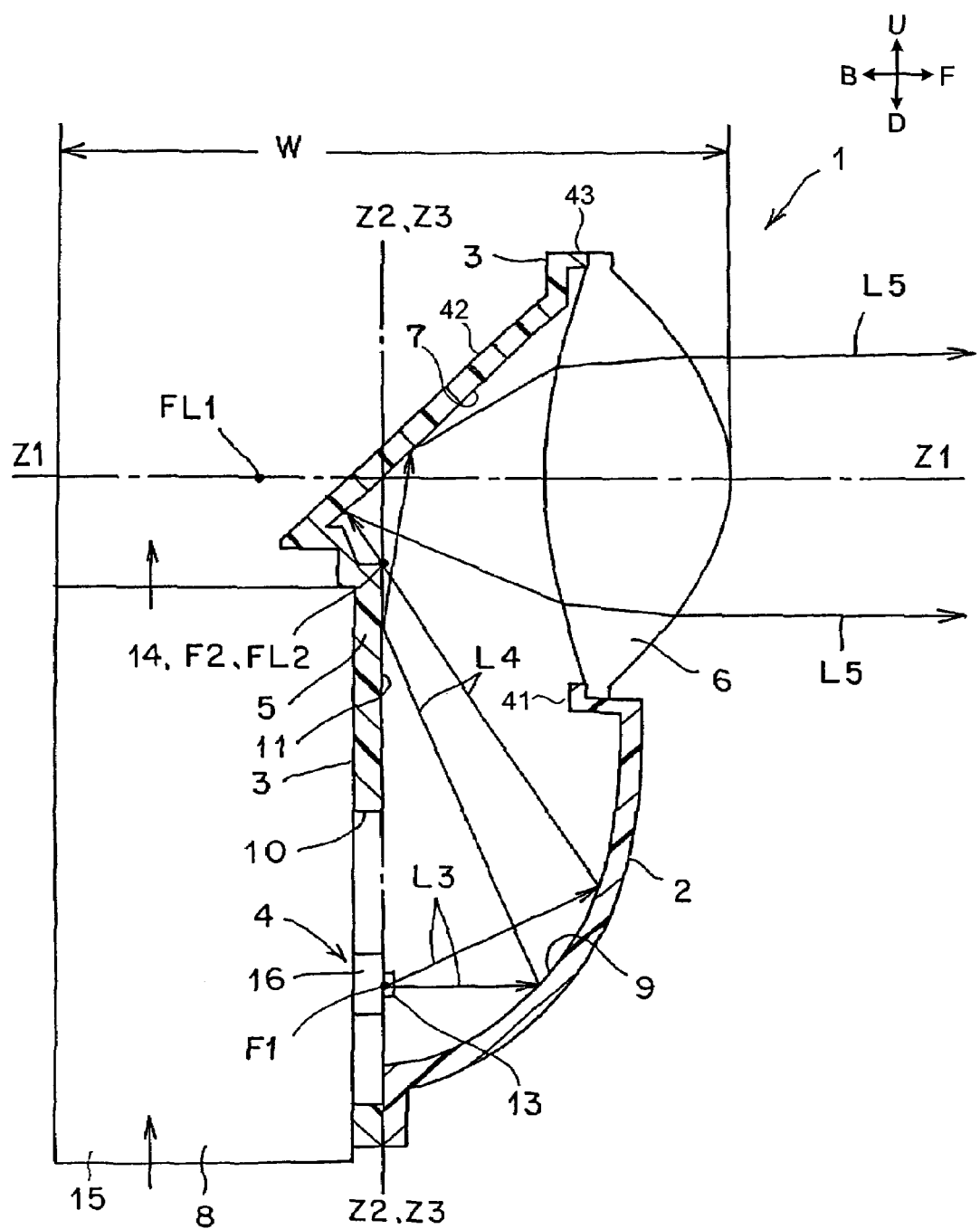

As shown in FIGS. 9 and 10, the lens focal point FL1 presents as a pseudo lens focal point FL2 at a position symmetrical with respect to the planar reflection surface 7 by the planar reflection surface 7. The pseudo lens focal point FL2 is located at the second focal point F2. Moreover, as shown in FIGS. 9 and 10, the horizontal lens optical axis Z1-Z1 presents as a vertical pseudo lens optical axis Z3-Z3 that intersects at right angles with the horizontal lens optical axis Z1-Z1 by the planar reflection surface 7. The vertical pseudo lens optical axis Z3-Z3 coincides with or substantially coincides with (hereinafter, simply "coincides with") the vertical optical axis Z2-Z2.

Consequently, as shown in FIG. 9, when the parallel light rays L1 of outside light enter the projection lens 6 from the outside, the parallel light rays L1 pass through the projection lens 6 and go out of the projection lens 6 to focus on the lens focal point FL1. However, the light rays L1 that go out of the projection lens 6 are reflected by the planar reflection surface 7, and reflected light rays L2 focus on the pseudo lens focal point FL2, that is, the second focal point F2. As shown in FIGS. 9 and 10, the horizontal lens optical axis Z1-Z1 is bent at right angles by the planar reflection surface 7 to present as the vertical pseudo lens optical axis Z3-Z3 that coincides with the vertical optical axis Z2-Z2. In FIG. 9, the closing portion 42 that is integral with the second reflector 3 is not hatched.

The lamp units 1 are fixed to the heat sink 8 having a unit structure with the screws 18. The lamp units 1 are held by the holder 12 through the heat sink 8 in a rotatable manner around the vertical axis V. The vertical axis V goes through the semiconductor light source 4 of the central lamp unit 1 or in the vicinity thereof. The lamp unit 1 in a center side of the vehicle (on the left side) is positioned ahead of the vertical axis V in the light radiating direction, and the lamp unit 1 on an outer side of the vehicle (on the right side) is positioned behind the vertical axis V in the light radiation direction.

Figure 3:
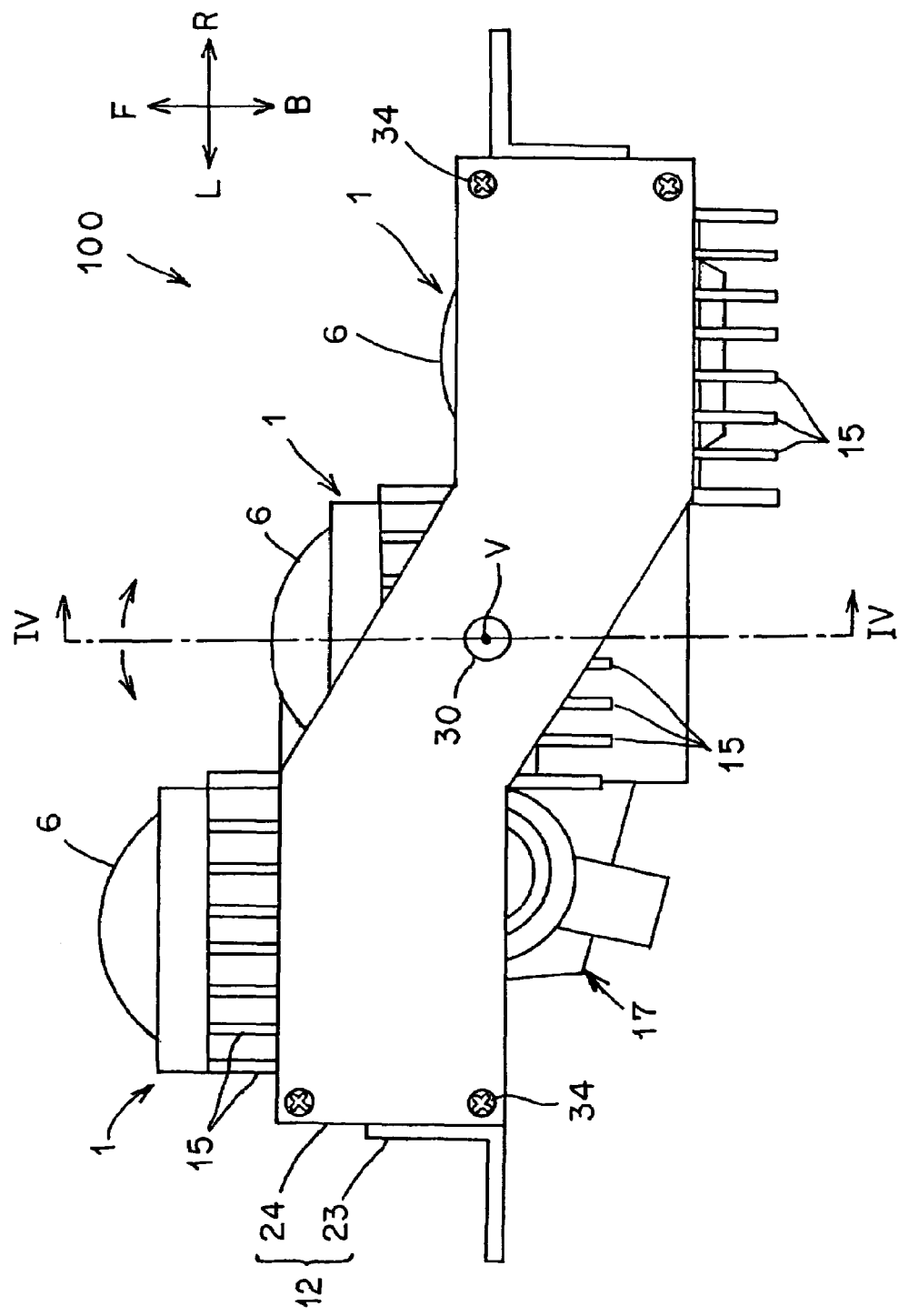
FIG. 3 is a top view of the vehicle lighting device.
Figure 4:
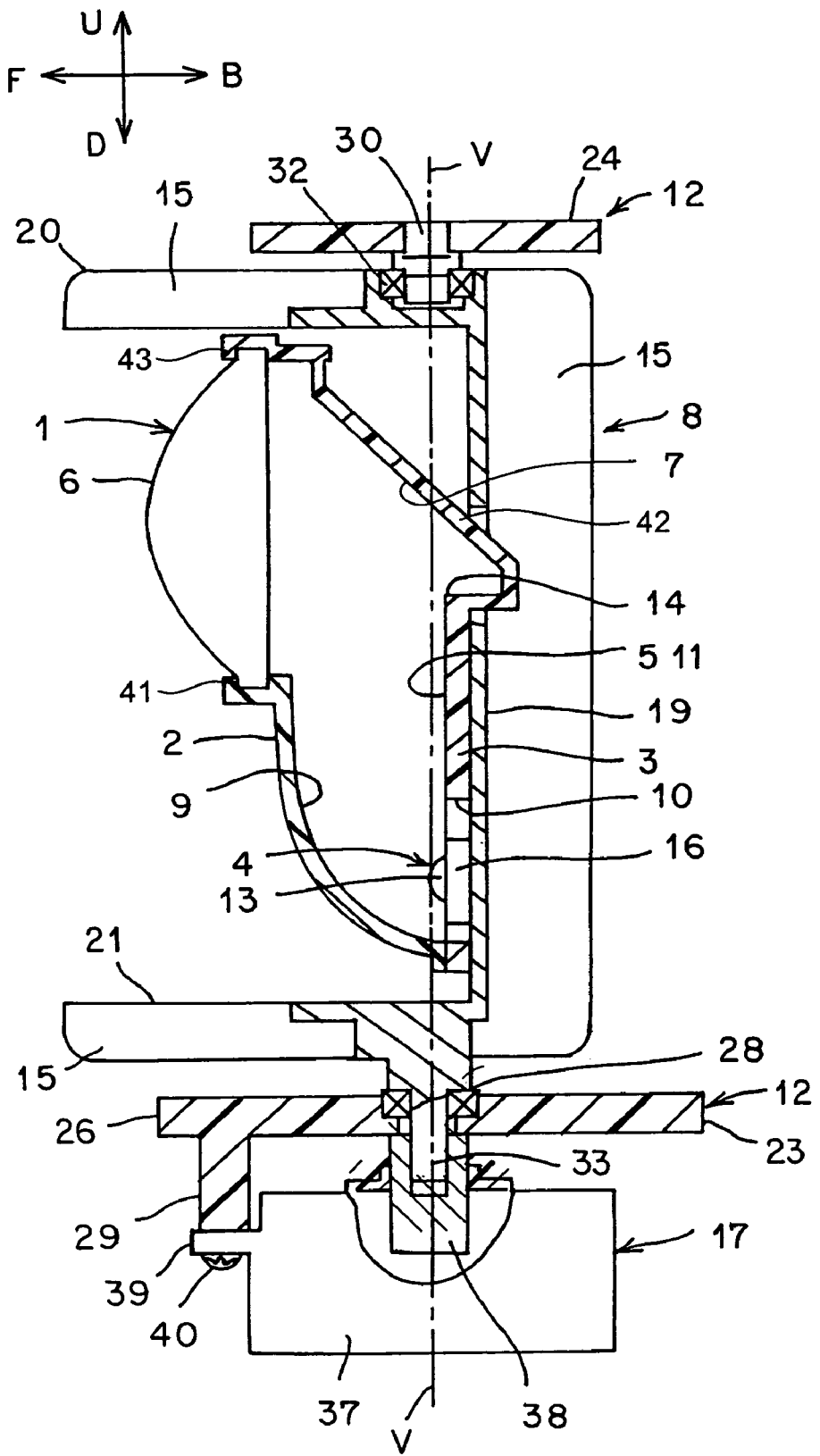
FIG. 4 is a cross section of the vehicle lighting device taken along line IV-IV in FIG. 3.
Figure 5:
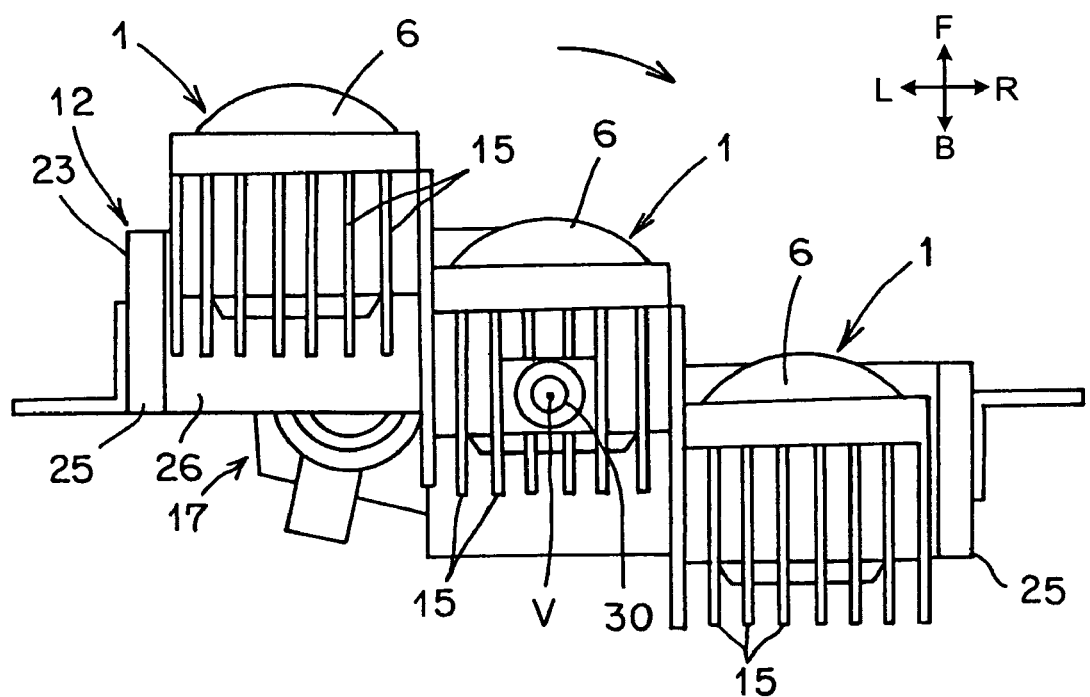
FIG. 5 is top view of the vehicle lighting device in which a top plate in FIG. 3 is removed and the lamp units are directed forward.

In other words, at least one of the lamp units 1 is positioned on the backside of the vertical axis V in the light radiation direction. Therefore, as shown in FIG. 3, the lamp units 1 are arranged in a stepwise fashion to comply with a lateral slant (a lateral inclination) of a vehicle, that is, a shape of a vehicle body whose front portion slants toward both sides from the center.

The heat sink 8 is made of a material with high heat conductivity, and is formed by, for example, aluminum die-casting. The heat sink 8 integrally includes central vertical portions 19, upper end horizontal portions 20, and lower end horizontal portions 21. The number of each of the central vertical portions 19, the upper end horizontal portions 20, and the lower end horizontal portions 21 is three corresponding to the number of the lamp units 1, and they are each arranged in a stepwise fashion.

The central vertical portion 19 is formed by integrally providing a plurality of fins 15 on a back surface (a rear surface) of a planer plate in a vertical direction with appropriate intervals. The upper end horizontal portion 20 and the lower end horizontal portion 21 are formed by integrally providing the fins 15 on an upper side of a planer plate and on a lower side of a planer plate in a horizontal direction with appropriate intervals, respectively. The heat sink 8 is placed vertically.

A planer back surface of the substrate 16 is in close contact with a planer front surface of the central vertical portion 19 through the holder member so that the planer back surface is vertical. The semiconductor light sources 4 are fixed to the heat sink 8 through the holder member. The heat sink 8 radiates heat generated from the semiconductor light sources 4 to the outside.

A plurality of (four in the embodiment) screw holes 22 into which the screws 18 are screwed are formed roughly at the four corners of each central vertical portion 19. By screwing the screws 18 into the screw holes 22 through the lamp units 1, the lamp units 1 are fixed to the heat sink 8 having a unit structure. The central vertical portions 19 are positioned on the back surfaces of the lamp units 1. The upper end horizontal portions 20 cover the upper portions of the lamp units 1, and the lower end horizontal portions 21 cover the lower portions of the lamp units 1.

The lamp units 1 are held by the holder 12 through the heat sink 8 in a rotatable manner around the vertical axis V. The holder 12 includes a housing 23 and a top plate 24.

The housing 23 has a concave shape, and includes right and left side plates 25 and a bottom plate 26. Screw holes 27 are formed in the upper end surface of each side plate 25. A lower bearing 28 is provided on the bottom plate 26 on the vertical axis V. Specifically, the lower bearing 28 is pressed and fixed to the hole formed in the bottom plate 26. A plurality of bosses 29 are integrally provided on the bottom surface of the bottom plate 26.

An upper rotation shaft 30 is provided on the top plate 24 on the vertical axis V. Specifically, the upper rotation shaft 30 is pressed and fixed to the hole formed in the top plate 24. The upper rotation shaft 30 can be integrally provided to the top plate 24. Screw holes (or through holes) 31 are formed at the four corners of the top plate 24.

An upper bearing 32 is provided on the vertical axis V of the upper end horizontal portion 20 in the center. Specifically, the upper bearing 32 is pressed and fixed to the holes formed in the upper end horizontal portion 20 in the center. A lower rotation shaft 33 is integrally provided on the vertical axis V of the lower end horizontal portion 21 in the center.

The lower rotation shaft 33 is rotatably supported by the lower bearing 28, and the upper rotation shaft 30 is rotatably supported by the upper bearing 32. Screws 34 are screwed into the screw holes 27 through the screw holes 31. Thus, the lamp units 1 are held by the holder 12 through the heat sink 8 in a rotatable manner around the vertical axis V.

A pin 35 is provided on the center of the upper end surface of each side plate 25. The pins 35 are fitted into small through holes 36 formed in the center of the both sides of the top plate 24. Thus, the top plate 24 can be temporarily attached to the housing 23, and the pins 35 can serve as a positioning reference for allowing the upper bearing 32 to rotatably support the upper rotation shaft 30 and for screwing the screws 34 into the screw holes 27 through the screw holes 31.

The drive unit 17 includes a casing 37, a drive part such as a stepping motor (not shown) that is housed in the casing 37, a drive shaft 38 that is connected to the stepping motor and projects from the casing 37, and attaching portions 39 that are integrally provided to the casing 37. The stepping motor is electrically connected to a control unit of an AFS or a power source (not shown) through a connector or a harness.

The attaching portions 39 are attached to the bosses 29 with screws 40, and the drive shaft 38 and the lower rotation shaft 33 are fitted to each other. The fitting parts of the drive shaft 38 and the lower rotation shaft 33 are knurled or chamfered, so that the drive shaft 38 and the lower rotation shaft 33 rotate integrally.

The vehicle lighting device 100 is assembled in the following manner. The lamp units 1 and the heat sink 8 are first assembled to each other. Specifically, the semiconductor light source 4 is fixed to the front surface of the central vertical portion 19 through the holder member. At this time, the substrate 16 is in contact with the front surface of the central vertical portion 19 in a vertical manner.

Next, the back surface of the second reflector 3 having a vertical plate shape is made in contact with the front surface of the central vertical portion 19. At this time, because of the positioning function of the holder member, the second reflector 3 and the semiconductor light source 4 are positioned in three directions, and the semiconductor light source 4 is positioned at the opening 10 through the holder member.

Then, the back surface of the first reflector 2 is made in contact with the front surface of the second reflector 3. The screws 18 are screwed into the screw holes 22 through the screw holes of the first reflector 2 and the second reflector 3 from the front side to the backside in a fitting direction, so that the first reflector 2, the second reflector 3, and the heat sink 8 are fixed at the same time.

Upon fixing of the first reflector 2, the second reflector 3, and the heat sink 8 at the same time, the projection lens 6 is positioned by the edge 41 having a lower semicircular shape and the edge 43 having an upper semicircular shape, and is attached to the first reflector 2 and the second reflector 3. The projection lens 6 can be attached with a ring member to the first reflector 2 and the second reflector 3 that are fixed to the heat sink 8. In this manner, the lamp units 1 and the heat sink 8 are assembled.

Next, the attaching portions 39 are attached to the bosses 29, so that the drive unit 17 and the housing 23 are assembled.

Next, the lower rotation shaft 33 of the heat sink 8 assembled with the lamp units 1 is inserted into the lower bearing 28 of the housing 23 assembled with the drive unit 17 to be rotatably supported by the lower bearing 28, and is dropped into the drive shaft 38 of the drive unit 17 assembled with the housing 23 in the vertical axis V direction. Whereby, the lamp units 1, the heat sink 8, the housing 23, and the drive unit 17 are assembled. The lower end horizontal portions 21 are positioned in a clearance between the lower portions of the lamp units 1 and the lower portion of the holder 12, i.e., the bottom plate 26.

The upper rotation shaft 30 of the top plate 24 is dropped in the vertical axis V direction into the upper bearing 32 of the heat sink 8 assembled with the lamp units 1, the housing 23, and the drive unit 17 to be rotatably supported by the upper bearing 32. At this time, the pins 35 are fitted into the small through holes 36, so that the housing 23 and the top plate 24 are temporarily attached to each other. In this state, by screwing the screws 34 into the screw holes 27 through the screw holes 31, the top plate 24 is assembled to the housing 23. The upper end horizontal portions 20 are positioned in a clearance between the upper portions of the lamp units 1 and the upper portion of the holder 12, i.e., the top plate 24. The housing 23 of the vehicle lighting device 100 assembled in such manner is attached to the lamp housing through an optical axis adjusting mechanism.

The vehicle lighting device 100 is operated in the following manner. The emitter of the semiconductor light source 4 is first turned on. Then, light rays L3 are radiated from the emitter. The light rays L3 are reflected by the first reflection surface 9, and the reflected light rays L4 focus on the second focal point F2 and the pseudo lens focal point FL2. Some of the reflected light rays L4 are cut off by the shade 5, which are reflected by the second reflection surface 11 that is integral with the shade 5 to thereby form the predetermined auxiliary light distribution pattern (not shown). The remaining reflected light rays L4 form the predetermined light distribution pattern for passing LP having the cutoff line CL.

As shown in FIG. 6, the predetermined auxiliary light distribution pattern and the predetermined light distribution pattern for passing LP having the cutoff line CL pass through the projection lens 6 and are synthesized as a light reflected by the planar reflection surface 7 as if it is emitted from the lens focal point FL1, and are projected forward of the vehicle as a predetermined light distribution pattern (light rays L5 projected from the projection lens 6) to illuminate a road surface.

When the vehicle is steered to the right, the stepping motor of the drive unit 17 is driven due to the control operation by the control unit of the AFS. Then, the drive shaft 38 rotates, and the lamp units 1 and the heat sink 8 rotate in a right direction around the vertical axis V (clockwise in FIG. 5) with respect to the holder 12 and the drive unit 17 to change from the state shown in FIG. 5 to the state shown in FIG. 7. With the rotation, the light distribution pattern for passing LP having the cutoff line CL radiated from the lamp units 1 is changed from the state shown in FIG. 6 to the state shown in FIG. 8. In other words, the light distribution pattern for passing LP is shifted to the right direction (a direction indicated by a solid-line arrow in FIG. 6).

The heat generated from the semiconductor light source 4 is transmitted to the heat sink 8, and is dissipated to the air (outside) via the heat sink member 8.

As described above, according to the embodiment, the planar reflection surface 7 is arranged between the projection lens 6 and the lens focal point FL1 so that the planar reflection surface 7 intersects with the horizontal lens optical axis Z1-Z1. Therefore, in the lamp unit 1, the lens focal point FL1 presents as the pseudo lens focal point FL2 at a position symmetrical to the lens focal point FL1 with respect to the planar reflection surface 7 by the planar reflection surface 7, the pseudo lens focal point FL2 is positioned at the second focal point F2, the horizontal lens optical axis Z1-Z1 presents as the vertical pseudo lens optical axis Z3-Z3 that intersects at right angles with the horizontal lens optical axis Z1-Z1 by the planar reflection surface 7, and the vertical pseudo lens optical axis Z3-Z3 coincide with the vertical optical axis Z2-Z2. Thus, the projection lens 6 and the planar reflection surface 7 can be arranged in a horizontal direction, and the projection lens 6 and the planar reflection surface 7, and the first reflector 2, the second reflector 3, the semiconductor light source 4, and the shade 5 can be arranged in a vertical direction. Accordingly, because the lamp unit 1 is placed vertically, the length W thereof in the horizontal direction can be decreased, leading to decreasing the space needed for rotating the lamp units 1, which results in increasing the degree of freedom of layout of the lamp units 1 in the positional relationship relative to other vehicle devices and components.

Moreover, according to the embodiment, because the lamp units 1 are rotatable around the vertical axis V, the vehicle lighting device 100 can comply with the AFS. In other words, the vehicle lighting device 100 can change the light radiating direction of the lamp units 1 according to the driving condition of the vehicle.

Furthermore, according to the embodiment, the semiconductor light source 4 is in close contact with the central vertical portion 19 of the heat sink 8 so that the substrate 16 of the semiconductor light source 4 is vertical, and the heat sink 8 is placed substantially vertically. Therefore, the semiconductor light source 4 and the central vertical portion 19 are arranged in the horizontal direction, so that the heat generated from the semiconductor light sources 4 is dissipated efficiently through the heat sink 8.

Moreover, according to the embodiment, because the first reflector 2, the second reflector 3, the semiconductor light source 4, the projection lens 6, and the planar reflection surface 7, and the heat sink 8 can be arranged in the horizontal direction, the upper side of the central vertical portion 19 can be exposed to the air, thereby dissipating the heat from the semiconductor light sources 4 to the air more efficiently.

Furthermore, according to the embodiment, because the upper end horizontal portions 20 of the heat sink 8 are positioned in the clearance between the upper portion of the lamp units 1 and the upper portion of the holder 12, i.e., the top plate 24, and the lower end horizontal portions 21 of the heat sink 8 are positioned in the clearance between the lower portion of the lamp units 1 and the lower portion of the holder 12, i.e., the bottom plate 26, the heat from the semiconductor light sources 4 can be dissipated to the air more efficiently.

Moreover, according to the embodiment, because the lamp units 1 are fixed to the heat sink 8 that is a unit structure, the lamp units 1 can be surely positioned to the holder 12 by attaching the lamp units 1 to the holder 12 through the heat sink 8 in a rotatable manner around the vertical axis V. Thus, the vehicle lighting device 100 can change the light radiating direction of the lamp units 1 according to the driving condition of the vehicle with high accuracy.

Furthermore, according to the embodiment, because the vertical axis V passes through the semiconductor light source 4 of the lamp unit 1 in the center or in the vicinity thereof, the radius of rotation of the lamp units 1 can be smaller, enabling to make the space needed for rotating the lamp units 1 smaller.

Moreover, according to the embodiment, the lamp unit 1 in the center side of the vehicle (on the left side) is positioned ahead of the vertical axis V in the light radiating direction, and the lamp unit 1 on the outer side of the vehicle (on the right side) is positioned behind the vertical axis V in the light radiating direction. In other words, one of the lamp units 1 is positioned behind the vertical axis V in the light radiating direction. Therefore, when the light radiating direction of the light from the lamp units 1 is changed to the outer side of the vehicle, the light radiating range (the light distribution range) is widened to the outer side of the vehicle. Thus, the lamp units 1 can radiate light in a wide range merely by rotating the lamp units 1 by a small angle. Consequently, the light radiating direction can be smoothly changed according to the driving condition of the vehicle, enabling to contribute to the traffic safety. In addition, because the vehicle lighting device 100 can comply with a lateral slant (a lateral inclination) of a vehicle, that is, a shape of a vehicle body whose front portion slants toward both sides from the center, the degree of freedom of a vehicle body design is improved.

Moreover, according to the embodiment, the assembly of the lamp units 1 and the heat sink 8 is dropped to be assemble to the housing 23 and the drive unit 17, and the holder 12 and the top plate 24 are dropped to be assembled to the resultant assembly of the lamp units 1, the heat sink 8, the housing 23, and the drive unit 17. Thus, the efficiency of the assembling operation is improved.

Although the vehicle headlamp is explained as the vehicle lighting device 100 in the embodiment, the vehicle lighting device 100 can be any lighting device other than the vehicle headlamp, such as a tail lamp, a brake lamp, a tail/brake lamp, and a backup lamp of a rear combination lamp.

Furthermore, although the vehicle lighting device 100 includes the first reflection surface 9 and the second reflection surface 11 in the embodiment, the vehicle lighting device 100 can include only a substantially elliptical shaped reflection surface.

Moreover, although the light distribution pattern for passing LP having the cutoff line CL and the auxiliary light distribution pattern are radiated in the embodiment, the predetermined light distribution pattern can be a light distribution pattern having no cutoff line, such as a light distribution pattern for fog lamp, a light distribution pattern for wet road, a light distribution pattern for daytime lamp, a light distribution pattern for tail lamp, a light distribution pattern for brake lamp, a light distribution pattern for tail/brake lamp, and a light distribution pattern for backup lamp.

Furthermore, although the first reflector 2 and the second reflector 3 are formed of separate members, and are fixed to each other together with the heat sink 8 with the screws 18 as the fixing members in the embodiment, the first reflector 2 and the second reflector 3 can be formed integrally.

Moreover, although the projection lens 6, the first reflector 2, and the second reflector 3 that are formed of separate members are assembled to each other in the embodiment, the projection lens 6, the first reflector 2, and the second reflector 3 can be formed integrally.

Furthermore, although the planar reflection surface 7 is provided to the closing portion 42 that is integral with the second reflector 3 in the embodiment, the second reflector 3 and the closing portion 42 can be formed of separate members, and the planar reflection surface 7 can be provided to the closing portion 42 or the planar reflection surface 7 and the closing portion 42 can be integral with each other.

Moreover, although the lamp units 1 are fixed in a stepwise fashion to the heat sink 8 having a unit structure in the embodiment, the number of the lamp units 1 can be one, two, or four or more, and the lamp units 1 can be fixed to the heat sink 8 in any manner.

Furthermore, although the upper end horizontal portions 20 and the lower end horizontal portions 21 are provided to the heat sink 8 in the embodiment, the heat sink 8 can be provided with either one of the upper end horizontal portions 20 and the lower end horizontal portions 21, or the upper end horizontal portions 20 and the lower end horizontal portions 21 may not be provided to the heat sink 8.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle lighting device comprising:
   at least one lamp unit of a projector-type;
   a holder that holds the lamp unit in such a manner that the lamp unit the lamp unit rotates around a substantially vertical axis; and
   a drive unit that drives the lamp unit, wherein
   the lamp unit includes
      a reflector including a reflection surface having a substantially elliptical shape with a first focal point, a second focal point, and an optical axis,
      a semiconductor light source including a light emitter located at or near the first focal point,
      a projection lens including a lens focal point and a lens optical axis, in which the lens optical axis is substantially horizontal, the projection lens projecting a predetermined light distribution pattern (LP) in a predetermined direction, and
      a planer reflection surface arranged between the projection lens and the lens focal point to intersect with the lens optical axis, and the planer reflection surface reflecting the predetermined light distribution pattern toward the projection lens,
   the lens focal point presents as a pseudo lens focal point at a position symmetrical with respect to the planar reflection surface by the planar reflection surface,
   the pseudo lens focal point is positioned at or near the second focal point,
   the lens optical axis presents as a pseudo lens optical axis that intersects at a right angle with the lens optical axis by the planar reflection surface,
   the pseudo lens optical axis substantially coincides with the optical axis, and
   a light radiating direction of a light ray radiated from the lamp unit is changed according to a driving condition of a vehicle.

2. The vehicle lighting device according to claim 1, further comprising a heat sink to which the lamp unit is fixed, wherein
   the semiconductor light source is in contact with the heat sink so that a surface of a substrate of the semiconductor light source is substantially vertical,
   the heat sink includes a central vertical portion to which the lamp unit is fixed and that is in contact with the semiconductor light source, and an end horizontal portion that is positioned between at least one of a clearance between an upper portion of the lamp unit and an upper portion of the holder and a clearance between a lower portion of the lamp unit and a lower portion of the holder, and
   the heat sink is placed substantially vertically.

3. The vehicle lighting device according to claim 2, wherein the heat sink has a unit structure.

4. The vehicle lighting device according to claim 1, wherein
   a plurality of lamp units is provided, and
   at least one of the lamp units is positioned substantially behind the substantially vertical axis in the light radiating direction.

* * * * *